United States Patent [19]

Blake

[11] 4,314,008
[45] Feb. 2, 1982

[54] THERMOELECTRIC TEMPERATURE STABILIZED BATTERY SYSTEM

[75] Inventor: Charles R. Blake, El Segundo, Calif.

[73] Assignee: General Electric Company, Gainesville, Fla.

[21] Appl. No.: 179,959

[22] Filed: Aug. 22, 1980

[51] Int. Cl.³ .......................................... H01M 14/00
[52] U.S. Cl. ........................................ 429/8; 429/120
[58] Field of Search ................................... 429/120, 8

[56] References Cited

U.S. PATENT DOCUMENTS

| | | | |
|---|---|---|---|
| 3,525,386 | 8/1970 | Grover | 429/120 X |
| 3,570,260 | 3/1971 | Smith et al. | 429/120 X |
| 3,915,741 | 10/1975 | Kogiso | 429/120 X |
| 4,097,654 | 6/1978 | Guazzoni | 429/120 X |
| 4,126,734 | 11/1978 | Walters | 429/120 X |
| 4,169,918 | 10/1979 | Moore | 429/120 X |
| 4,229,687 | 10/1980 | Newman | 429/120 X |

Primary Examiner—Charles F. LeFevour
Attorney, Agent, or Firm—Morgan, Finnegan, Pine, Foley & Lee

[57] ABSTRACT

A temperature stabilized battery system including a battery having at least one rechargeable electrochemical cell, a Peltier type heat pump providing a hot thermal transfer face, a cold thermal transfer face and semiconductor means for transferring thermal energy between the two faces, one thermal transfer face being in thermal transfer relation to the battery and the other face being in thermal transfer relation to a heat sink. Thermal insulation surrounds at least a portion of the battery for reducing the flow of heat into and out of the battery except via the heat pump. The battery is wrapped or encased in a thermally conductive blanket which is surrounded by the insulation means.

9 Claims, 6 Drawing Figures

THERMOELECTRIC TEMPERATURE STABILIZED BATTERY SYSTEM

BACKGROUND OF THE INVENTION

This invention relates to battery systems which are adapted to operate under a stabilized temperature condition.

Complex and sensitive electronic equipment is finding an ever expanding variety of applications. The advent of solid state microelectronic technology enables this electronic equipment to be operated effectively at low voltage and under small or moderate current drain. That fact makes it possible to power the equipment with a rechargeable battery source under certain conditions. A familiar example is the case of digital computers in which a battery is used as a standby power source to protect the computer memory against erasure. During normal operation the computer is operated from line power. A standby power source, supplied by rechargeable batteries, is automatically switched into the power circuit in the event of line power failure. Under normal operation conditions, when the line source is operative, the standby battery is maintained in a charged condition by a low level, usually continuous charging current.

Computers and other electronic circuits may be subjected to temperature extremes which would impair the performance of the standby battery and/or reduce its life expectancy. The harmful influence of excessive heat or cold on, for example, nickel-cadmium cells (a frequently used type of rechargeable cell) is known. These cells incorporate electrolyte absorbent separators between the positive and negative electrodes. The separators are fabricated from fibrous or porous materials such as nylon or polypropylene. Nylon separators are known to oxidize at high temperatures, resulting in a loss of chemical and physical integrity. Additionally, charge acceptance is significantly reduced at high temperatures, while charge voltage and charge retention are depressed. Because of the depression in the terminal voltage relative to a fixed end-of-discharge cutoff voltage, the available cell capacity is also reduced. For any given cell design, capacity reduction becomes increasingly significant as discharge current increases.

Polypropylene separators are able to withstand considerably higher temperatures than nylon separators, and this reduces short circuit failure due to separator failure. Nevertheless, the performance limitations at elevated temperatures noted above are still present. Thus, the chemical effects at elevated temperatures degrade the cells' electrical performance irrespective of the type of separator used.

Rechargeable cells also suffer in performance at low temperatures. One of the most serious limitations is the rise in internal cell resistance at low temperatures due to diminished electrochemical activity and the reduced electrolyte mobility. This results in a lower output voltage and less discharge current. Charging performance, on the other hand, is also affected. At low temperatures the plate recombination capability of the system cannot balance the input charge rate, and this causes a rise in the cell's internal gas pressure. If the gas pressure builds up to a point exceeding the venting threshhold, the safety vent valve opens and a certain amount of electrolyte is lost with each vent opening.

Electrochemical cells can be designed to improve their ability to perform at and withstand temperature extremes. Thus, it is possible to design a cell so as to alleviate some of the above-noted limitations. If such a cell is designed for high temperature, however, its low temperature performance is generally even further degraded, and vice versa. It is difficult, if not impossible or impracticable, to design a cell so that it achieves adequate performance at both temperature extremes.

SUMMARY OF THE INVENTION

The present invention deals with the problem of rechargeable cells and batteries which must operate in hostile temperature environments. In brief, the invention consists of a novel battery system wherein the rechargeable battery is contained within a discrete temperature controlled environment. The battery itself may employ ordinary rechargeable cells which need not embody any special features to compensate for temperature extremes.

The system, in general, comprises at least one electrochemical cell for providing electrical power to the load to be driven, a heat pump module having a hot thermal transfer face, a cold thermal transfer face and means for transferring thermal energy between these faces, one of the thermal transfer faces being in thermal transfer relation to the battery and the other thermal transfer face being in thermal transfer relation to a heat sink, and insulation means surrounding at least a portion of the battery for reducing the flow of thermal energy to and from the battery environment.

The battery system may be regarded as one having its own unique air-conditioning system for supplying or removing heat from the insulated enclosure surrounding the battery. In preferred embodiments, the battery comprises a plurality of electrochemical cells which are interconnected to provide the desired voltage and current output to a pair of terminals, the cells being surrounded or packaged in a thermally conductive enclosure in contact with one of the thermal transfer faces. The heat pump module preferably comprises a Peltier type of thermoelectric device having a pair of parallel heat transfer faces separated by a plurality of semiconductive junctions which, in response to current flowing therethrough, transfer heat from one face to the other. If the flow of current through these junctions is reversed, the cold junction becomes a hot junction, and vice versa. Thus, depending upon the direction of current flow, heat may be supplied to or extracted from the immediate environment of the cells.

BRIEF DESCRIPTION OF THE DRAWINGS

A representative embodiment of the invention is described in the following specification and drawings in which.

DETAILED DESCRIPTION OF THE PREFERRED EMBODIMENT

The invention is described below with reference to a specific embodiment which was constructed and operated satisfactorily under laboratory conditions. The system may, of course, take other physical forms. It will be understood, moreover, that the temperature-controlled battery systems of the invention have particular application to electrical systems wherein it is desired to provide emergency battery standby power in the event of interruption of the normal electrical input power.

Figure 1:
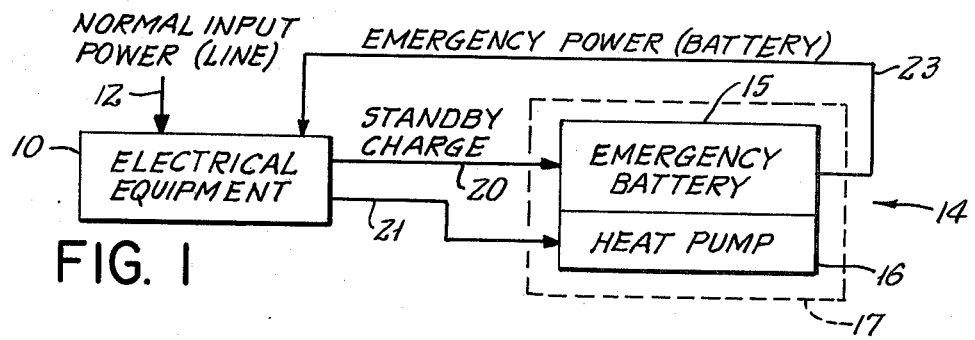
FIG. 1 is a schematic block diagram of a battery system according to the invention.

FIG. 1 illustrates such a system. There, the electrical equipment 10 normally receives its power from the line input 12. The system embodies, however, an emergency power unit, according to the invention, designated generally at 14. This unit includes an emergency battery 15 and a heat pump 16 in a discrete controlled environment, the boundary of this environment being illustrated schematically by the dashed-line enclosure 17. The battery system 14 is connected to the electrical equipment so that the standby battery receives a continuous standby charge via electrical input 20 during the time that normal input power is available. Additionally, the heat pump 16 is operated by power supplied via the conductor 21. The heat pump, when operating, tends to maintain the battery 15 at the desired operating temperature and thus stabilizes the battery temperature. Even though the battery unit's temperature is not precisely controlled as ambient temperature rises and falls, it stabilizes the temperature within a predetermined "target zone" for known ambient temperature limits and avoids the cell deterioration and performance limitations noted above.

If normal power input 12 is interrupted, as in the case of a momentary power shutdown, the battery 15 supplies emergency power on the battery system's output line 23. Of course, if normal input power is interrupted, the battery system 14 will cease to receive any standby battery charging current or any power to operate the heat pump. Nevertheless, the battery 15 will continue to operate normally for an extended time period since the battery is in a controlled temperature environment 17 which precludes rapid temperature changes. It may be noted that the temperature of this environment will change due to two factors: one, heat generated by the battery 15 due to the flow of current therethrough. This heat represents the equivalent $i^2R$ internal heating of the battery. Second, the environment 17 will receive (or lose) heat from the ambient as a result of a very slow heat transfer across the controlled environment boundary 17 which, in practice, is constituted of a well insulated enclosure.

Figure 1A:
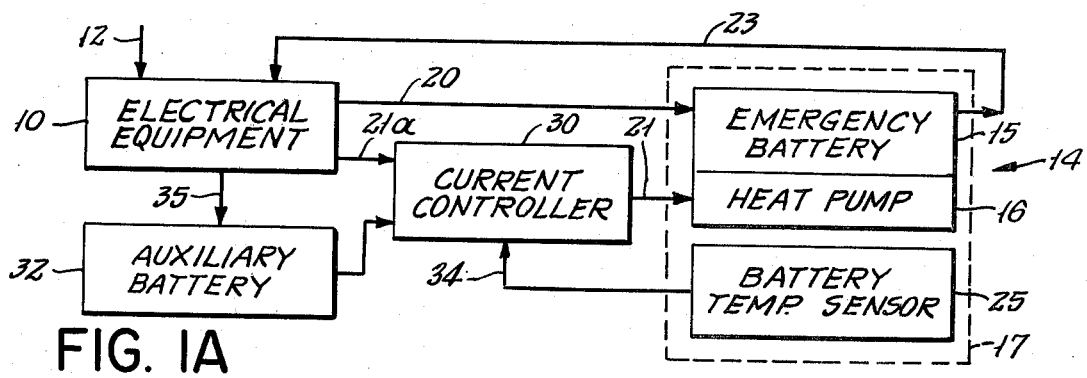
FIG. 1A is a schematic block diagram of an alternate embodiment of a battery system according to the invention.

A more sophisticated system in accordance with this invention is shown in FIG. 1A. In general, it functions similarly to that shown in FIG. 1 and common reference numerals have been used for the corresponding system elements. FIG. 1A, however, includes additional means for compensating the effects of changes in the ambient temperature and other factors which influence the degree to which battery temperature is stabilized. The additional components are a battery temperature sensor 25 located inside the temperature-controlled environment 17, a current control device 30 and a second battery 32.

As before, power is applied to heat pump 16 over conductor 21. This current, however, is controlled by a current control device 30 in response to an electrical signal developed by the temperature sensor 25. Sensor 25 produces an output signal representing the internal temperature of the battery system 14. It will be understood, in that regard, that the current control device 30 may be embodied in the electrical equipment 10 and receives its current over input conductor 21a.

Current controller 30 may comprise a switch or other device for regulating the amplitude of the current supplied to heat pump 16 according to the signal from the sensor 25. It may also include a direct current power supply for deriving an output voltage at a magnitude appropriate to the current required by the heat pump to maintain the battery at its normal operating temperature. The current controller 30 can also be adapted to reverse the polarity of the current to the heat pump in response to the signal from the battery temperature sensor 25. If the temperature of the battery system 14 exceeds a predetermined level, the current on conductor 21 will be of such a polarity to pump heat from the battery system 14 to the ambient. On the other hand, if the temperature of the battery system 14 falls below a predetermined level, then the current controller can be made to reverse the direction of the current to the heat pump so as to supply heat to the system.

Auxiliary battery 32 is supplied with normal standby charge current from the electrical equipment 10 over conductor 35. In the event of line power interruption, its purpose is to supply operative current to the heat pump 16 via the current controller 30, at least for a limited period of time. Battery 32 is in an uncontrolled environment and, of course, it would be subject to the performance limitations discussed above. However, since its purpose is to supply current only for a limited period of time and thus simply to extend the duration of the time during which the emergency battery 15 will be operating in a completely controlled temperature environment, it need not be given special protection from temperature extremes. In the system of FIG. 1A, of course, battery 32 could be omitted, while retaining the presence and function of the current controller 30.

Figure 2:
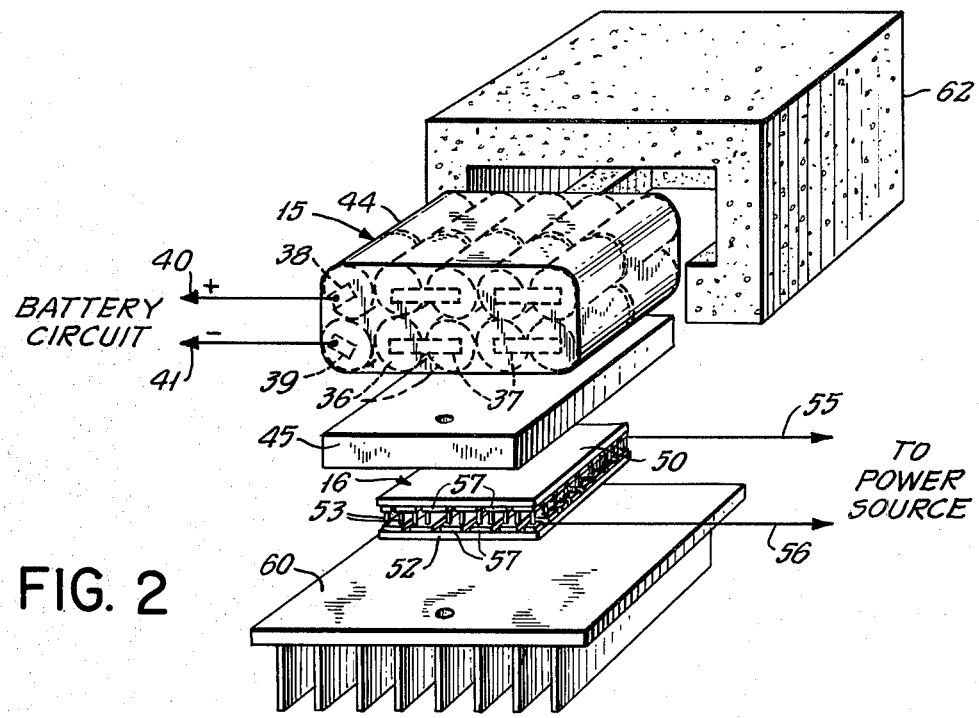
FIG. 2 is an exploded perspective view of the components of a battery system embodying the invention.
Figure 3:
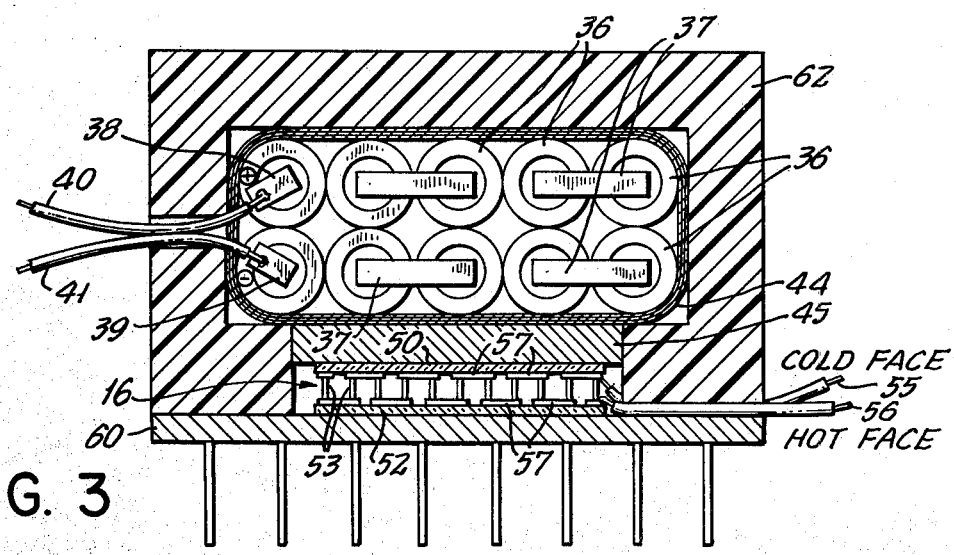
FIG. 3 is a cross-sectional view in elevation of the assembled system of FIG. 2.

FIGS. 2 and 3 illustrate the elements of the battery system 14 of the invention. First, it comprises a battery 15 made up of a series of rechargeable electrochemical cells 36 (shown by phantom lines in FIG. 2) that are interconnected by appropriate strap conductors 37 such that the cells 36 are in series between the positive terminal 38 and negative terminal 39. Suitable wire leads 40, 41, connected to the battery terminals are provided for connection to the electrical equipment to be supplied. The battery is enclosed in a thermally conductive enclosure or blanket 44. In the embodiment illustrated, this blanket 44 is made up of a plurality of wraps of conductive foil, such as aluminum foil. The function of blanket 44 is to equalize the temperature at all the cells 36 and also to serve as a heat transfer medium between the battery and the heat pump. Battery 15 by means of the conductive enclosure 44 is mated to the heat pump 16 by an intermediate thermally conductive block 45.

Heat pump 16 is what is known as a Peltier thermoelectric device. It is constructed so as to have two parallel electrically insulating plates providing hot and cold thermal transfer faces. Heat pump 16 has a top plate 50, a lower plate 52, and a multitude of alternating n-type and p-type semiconductor elements 53. These elements are interconnected in series between the heat pump terminals 55, 56. Adjacent semiconductor elements 53 within the device are joined by conductive strips 57 or printed circuitry bonded to the inside surfaces of the plates 50, 52 (FIG. 3).

In contact with the lower plate 52 of the heat pump is a finned heat sink 60. Battery enclosure 44, thermal transfer block 45, heat pump plate 50, 52, and heat sink 60 all should be joined together in good thermal contact, preferably aided by the use of a suitable heat sink grease at the interfaces between adjacent elements. Surrounding the battery 15 and all of the other components, with the exception of the heat sink 60, is an insulating enclosure 62. This enclosure is constructed of a material, such as urethane foam, having good thermal insulating properties. Its purpose is to retard the transfer of heat into or away from the battery package. Thus, as best seen in FIG. 3, the insulating enclosure 62 forms a thick blanket of insulation about the battery 15, the thermally conductive spacer block 45, and all sides of the heat pump with the exception of the side in contact with the heat sink 60.

Ordinarily, where the battery system is used in high temperature situations, the lower plate 52 will constitute the "hot" face of the heat pump, the "cold" face being the top plate 50. Thus, heat is transferred from the battery pack via the spacer block 45 to the cold face, and then is "pumped" to the hot face 52 for transfer to the heat sink 60. A temperature differential between the hot and cold faces of the heat pump is maintained by passing current through the input leads 55, 56. The advantage of the heat pump in this instance is the fact that it contains no moving parts, the p-n junctions at the plate 50 serving as a refrigerating junction when the heat pump is excited. Moreover, high thermoelectric efficiency can be achieved. It is possible, for example, to pump about 5 watts of heat from the cold face to the hot face of the device with about 4.5 watts input. Reversal of current through the device causes the top plate to become the hot face and the bottom face the cold face. Heat in such case is pumped into the battery.

Figure 4:
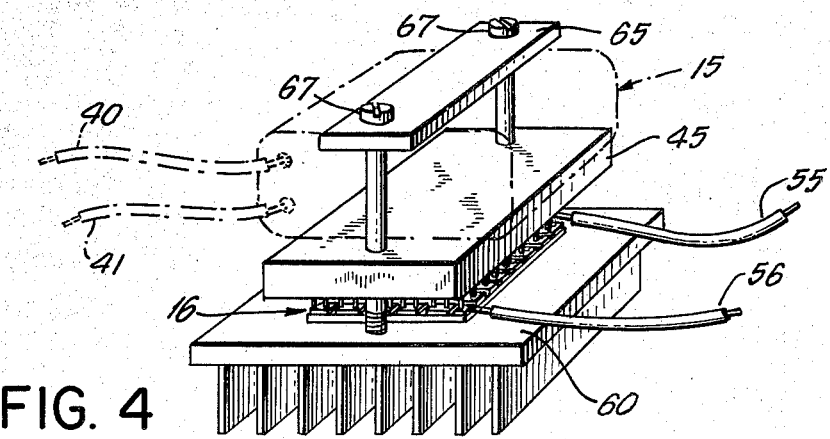
FIG. 4 is a perspective view of certain of the components of the system to illustrate the manner of fastening the components.

FIG. 4 illustrates one manner in which the elements of the system can be clamped together. As shown, a bracket 65 extends across the top of the battery pack 15. Screws 57 extend through holes in the bracket and in block 45 and into threaded holes in the heat sink 60. Screws 57 may be tightened to the degree necessary to obtain good thermal transfer at the interfaces between adjacent elements. After these elements have been clamped together, the thermal enclosure 62 is placed over them. In an alternative arrangement, clamp 65 may extend over the thermal enclosure 62. In this event, of course, the enclosure 62 should be made of a semirigid material or otherwise provided with adequate structural integrity so as to withstand the clamping pressure. The leads 55, 56, 40, 41 are brought out through the side walls of the enclosure 62.

Figure 5:
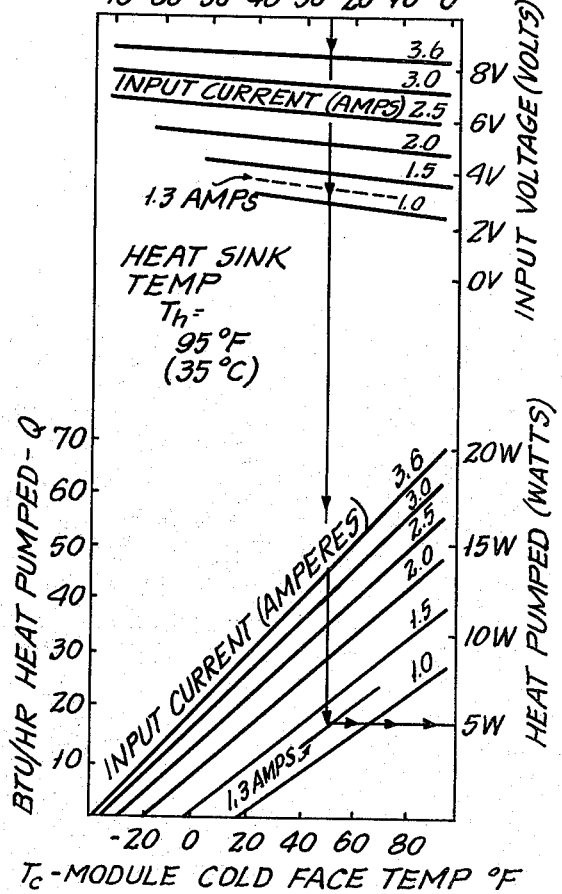
FIG. 5 is a graph plotting the thermoelectric characteristics of a typical Peltier type heat pump which may be used with the invention.

Referring now to FIG. 5, the graph plots a series of straight-line functions depicting the performance of a typical Peltier heat pump such as the Melcor Model CP1.4-71-10 L heat pump. FIG. 5 is merely representative of the performance graphs for the device and plots pump performance for a single assumed heat sink temperature (ambient temperature) of 35° C. Assuming that it is desired to maintain the battery at a given temperature, the required input current for any thermal load between 0 and 20 watts can be determined. An example follows.

Assume that the ambient temperature is 35° C., desired battery temperature is 10° C., power dissipated by the battery is 4 watts and heat loss through the insulating enclosure 62 is about 1 watt. Thus, heat to be pumped $Q_p = 4$ watts $+ 1$ watt $= 5$ watts. The temperature differential to be maintained, $\Delta T$, is defined as the difference between the ambient temperature and the battery temperature. Thus $\Delta T = T_h - T_C = 25°$ C.

Using FIG. 5, the required input wattage can be found. First, a vertical line is drawn down from the $\Delta T$ axis starting from the point $\Delta T = 25°$. Input current is found by locating the point at which this vertical line crosses horizontal line drawn from the 5 watts (heat pumped) axis at the right side of the graph. This point of intersection lies at a point falling between input currents of 1.0 amp and 1.5 amps. An input current of 1.3 amps is estimated. Accordingly, the input current required to pump 5 watts of heat from the cold face to the hot face is 1.3 amps. If this current is now used in the upper set of straight-line functions, the input voltage can also be found. For the case of an input current of 1.3 amps, an input voltage of about 3.5 volts is required. In the present example, therefore, the heat pump should be excited with a current of 3.5 volts from a source capable of supplying at least 1.3 amps. As the hot face temperature increases, the device becomes even more efficient and, thus, proportionately less power input would be required to remove heat from the battery.

The value of the system and battery of the present invention can be better appreciated with reference to a specific example. A battery of 20 D-size cells stored in a 70° C. ambient temperature will have a far shorter life and less available capacity as compared with the same battery stored at 40° C. ($\Delta T = 30°$ C.). When packaged and combined with a heat pump according to the invention, battery life is increased from 1.38 years to 2.6 years (MTTF). The available capacity of this battery at 40° C. (using 27° C. as the standard) is 80% of rated capacity versus 40% of rated capacity at 70° C. In other words, the available capacity of a battery maintained at a temperature of not greater than 40° C. is double that of a battery at 70° C. Moreover, the mid-point voltage (the voltage halfway through discharge) of a nickel-cadmium battery at 70° C. is only 1.05 volts. If the battery is maintained at a lower temperature of 40° C., however, the mid-point voltage is higher—approximately 1.20 volts. Thus, the cooler battery system has double the capacity and will last twice as long—a four-fold improvement in battery cost. Stated another way, only one-half the battery size (capacity) is required in batteries operating at 40° C. versus batteries operating at 70° C. Peltier heat pumps of the type described are, moreover, long-life devices of indefinite longevity and would not require replacement.

Although the invention has been described with reference to a particular embodiment, the invention should not be considered as limited to that particular embodiment, which is representative only. Thus, the battery pack itself may take a wide variety of forms, and certain elements (e.g., the thermally conducting spacer block) could in some instances be dispensed with. Furthermore, although the heat sink is described as a specific element, it could comprise the chassis or other part of an existing electronic component associated with the electrical equipment to be powered. What is required is that the heat sink or hot face be capable of dissipating heat at the required rate to maintain the interior of the insulated enclosure at the target temperature. It is also possible to use stacked Peltier modules of the type described, wherein two or more devices are stacked, the hot face of the upper module being thermally joined to the cold face of the next lower module. Except as expressly limited by the appended claims, the foregoing and other modifications are intended to be embraced within the scope of the claimed invention.

What I claim is:

1. A temperature-stabilized battery system adapted for operation in an environment having a different temperature than the system, comprising:

a battery having at least one electrochemical cell;

a Peltier type heat pump module having a hot thermal transfer face, a cold thermal transfer face and means for transferring thermal energy therebetween, one of the thermal transfer faces being in thermal transfer relation to said battery;

thermal insulation means surrounding at least a portion of said battery for reducing the flow of thermal energy to and from the battery; and a heat sink in thermal transfer relation to the other thermal transfer face of said heat pump module and exposed to the environment exterior to said battery for transferring thermal energy from said hot thermal transfer face to said cold thermal transfer face.

2. The temperature-stabilized battery system of claim 1, wherein said insulation means surrounds the exposed portions of said heat pump module except for the thermal transfer face associated with the heat sink.

3. The temperature-stabilized battery system of claim 1, further comprising:

a thermally conductive enclosure encasing said battery and surrounded by said insulation means, said enclosure being disposed in thermal transfer relation with said one thermal transfer face.

4. The temperature-stabilized battery system of claim 1, wherein said Peltier type heat pump module has at least one semiconductive junction in thermal contact with said cold thermal transfer face and at least one oppositely poled semiconductive junction in thermal contact with said hot thermal transfer face.

5. The temperature-stabilized battery system of claim 4, further comprising an electrical current source for establishing a current flow through said semiconductive junctions.

6. The temperature-stabilized battery system of claim 5, further comprising:

a temperature sensor responsive to the temperature of said battery and current control means responsive to said temperature sensor for regulating said current at a value tending to maintain the temperature of the battery at a predetermined value.

7. A temperature-stabilized battery system for supplying emergency electrical power to electrical equipment in the event of failure of external power normally supplied to such equipment, the system comprising:

at least one electrochemical cell constituting such battery, the battery being connectable to said electrical equipment upon the cessation of external power;

a Peltier type thermoelectric heat pump device having two mutually spaced plates, one of said plates constituting a hot thermal transfer face and the other of said plates constituting a cold thermal transfer face, and means between said plates for establishing a temperature differential between said hot and cold faces upon the passage of current therethrough;

means for thermally coupling one of said plates to said battery;

means for thermally coupling the other of said plates to thermal dissipating means exposed to the ambient environment; and thermal insulation means substantially surrounding said battery, heat pump and thermal coupling means, except for a portion of said heat pump means in thermal contact with said thermal dissipating means.

8. The temperature-stabilized system of claim 7, wherein said battery, heat pump, thermal coupling means and heat dissipating means are in stacked, juxtaposed relation, the system further comprising:

clamping means for holding adjacent ones of said juxtaposed elements in fixed mutual contact for good thermal transfer.

9. The temperature-stabilized battery system of claim 7, wherein the current for said heat pump is normally supplied from the external power, the system further comprising:

an auxiliary battery for supplying current to said heat pump, thereby to extend the duration of operation of said heat pump when external power is unavailable.

* * * * *